United States Patent
Kanefsky et al.

(10) Patent No.: US 7,809,697 B1
(45) Date of Patent: Oct. 5, 2010

(54) COMPRESSING HYPERLINKS IN A HYPERLINK-BASED DOCUMENT

(75) Inventors: Steve Kanefsky, Menlo Park, CA (US); Alex Nicolaou, Waterloo (CA); Terry Van Belle, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 333 days.

(21) Appl. No.: 11/937,884

(22) Filed: Nov. 9, 2007

(51) Int. Cl.
  *G06F 7/00* (2006.01)
  *G06F 17/00* (2006.01)

(52) U.S. Cl. .................. 707/693; 707/756; 715/206
(58) Field of Classification Search .............. 715/238, 715/208, 242, 206, 207; 707/999.101
See application file for complete search history.

(56) References Cited

U.S. PATENT DOCUMENTS

| | | | |
|---|---|---|---|
| 5,745,900 A * | 4/1998 | Burrows ................. 707/102 |
| 5,761,436 A * | 6/1998 | Nielsen ................... 709/245 |
| 6,286,053 B1 * | 9/2001 | Van Peursem et al. ...... 709/247 |
| 6,343,318 B1 * | 1/2002 | Hawkins et al. .......... 709/219 |
| 6,590,588 B2 * | 7/2003 | Lincke et al. ............ 715/744 |
| 6,772,139 B1 * | 8/2004 | Smith, III ............... 707/3 |
| 6,826,594 B1 * | 11/2004 | Pettersen ................ 709/203 |
| 6,968,334 B2 * | 11/2005 | Salmenkaita et al. ....... 707/10 |
| 7,025,209 B2 * | 4/2006 | Hawkins .................. 209/217 |
| 7,146,429 B2 * | 12/2006 | Michel ................... 709/238 |
| 7,340,467 B2 * | 3/2008 | Najork .................... 707/10 |
| 7,603,408 B1 * | 10/2009 | McGinnis et al. .......... 709/203 |

\* cited by examiner

*Primary Examiner*—Yicun Wu
*Assistant Examiner*—Pavan Mamillapalli
(74) *Attorney, Agent, or Firm*—Fish & Richardson P.C.

(57) ABSTRACT

A computer-implemented method can include accessing a network-accessible document that is formatted according to a hypertext markup language and that has a plurality of hyperlinks; producing a transcoded document from the network-accessible document; and providing the transcoded document to a computing device. Producing the transcoded document can include concatenating two or more of the plurality of hyperlinks to form a compression seed, compressing the compression seed with a compression algorithm to form a compressed seed, storing the compressed seed as a base hyperlink in the transcoded document, and compressing each of the plurality of hyperlinks. Compressing each hyperlink can include concatenating each hyperlink with the compression seed, compressing the concatenated hyperlink and compression seed to form a seed portion corresponding to the compression seed and a link portion corresponding to the hyperlink, extracting the seed portion, and substituting in the transcoded document the link portion for the hyperlink.

20 Claims, 8 Drawing Sheets

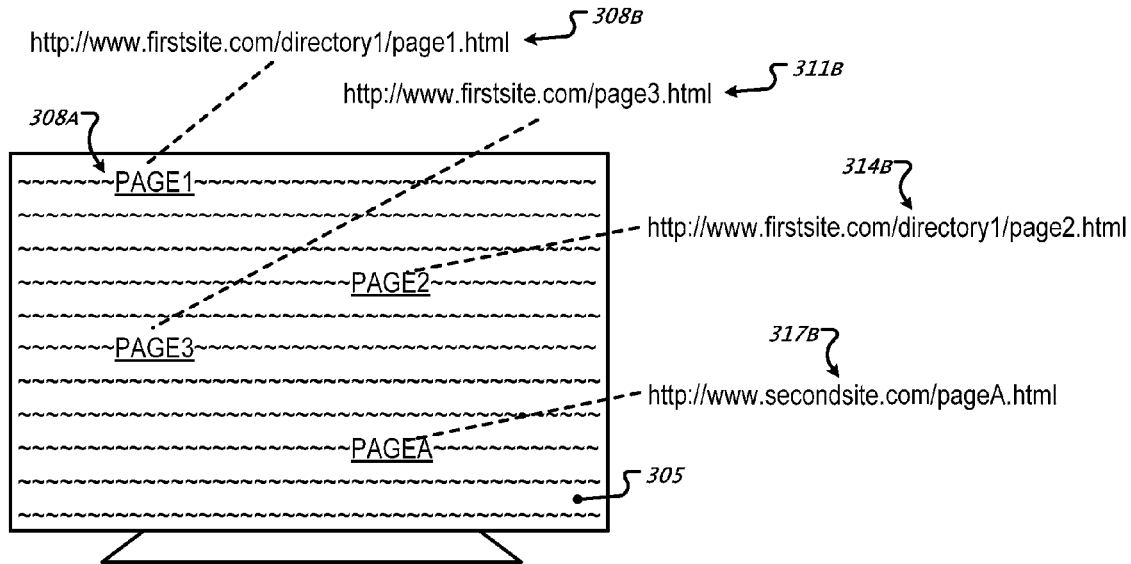

FIG. 3A

```
<!DOCTYPE HTML PUBLIC "-//W3C//DTD HTML 4.01//EN"
    "http://www.w3.org/TR/html4/strict.dtd">
<html>
<head>
<title> ~~~~~~~ </title>
...
</head>
...
<body>
...
<div>
```
~ <a href= "http://www.firstsite.com/directory1/page1.html">PAGE1</a> ~~~~~~~~

~~~~~~~ <a href= "http://www.firstsite.com/directory1/page2.html">PAGE2</a>~~~

~~~~<a href= "http://www.firstsite.com/page3.html">PAGE3</a>~~~~~~~~~

~~~~~~~~~<a href= "http://www.secondsite.com/pageA.html">PAGEA</a>~~~~~~

```
</div>
...
</body>
```

FIG. 3B

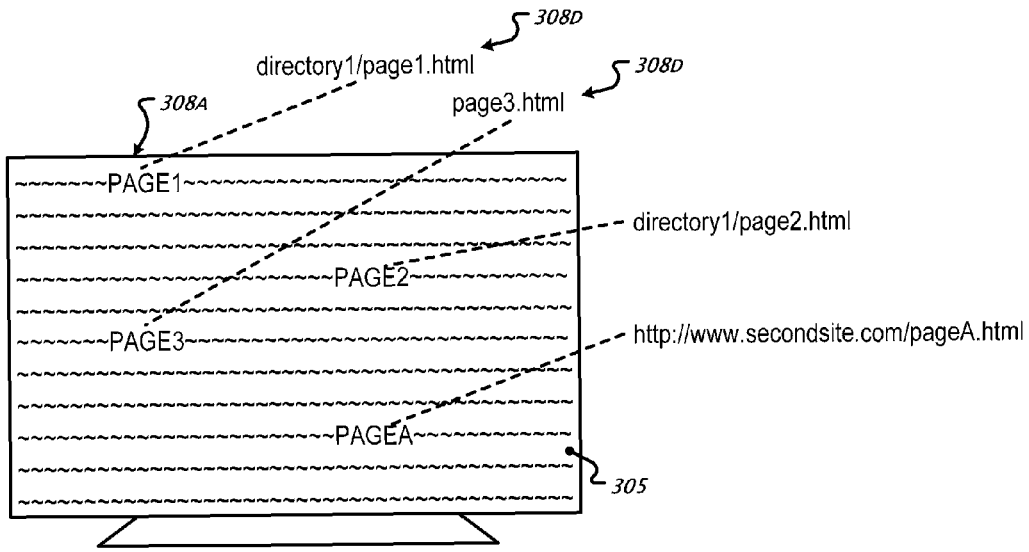

FIG. 3C

```
<!DOCTYPE HTML PUBLIC "-//W3C//DTD HTML 4.01//EN"
    "http://www.w3.org/TR/html4/strict.dtd">
<html>
<head>
<title> ~~~~~~~ </title>         308C
<base href="http://www.firstsite.com/" />
...
</head>
...
<body>
...
<div>           308D
~~ <a href="directory1/page1.html">PAGE1</a> ~~~~~~~~~
~~~~~~~~ <a href="directory1/page2.html">PAGE2</a>~~~~~~
~~~~~~<a href="page3.html">PAGE3</a>~~~~~~~~~~
~~~~~~~<a href="http://www.secondsite.com/pageA.html">PAGEA</a>~~~~~
</div>
...
</body>
```

FIG. 3D

COMPRESSING HYPERLINKS IN A HYPERLINK-BASED DOCUMENT

TECHNICAL FIELD

This document relates to compressing hyperlinks in a hyperlink-based document.

BACKGROUND

Vast amounts of information are available on the internet, the World Wide Web, and on smaller networks. Users of desktop, laptop, and notebook computers have long enjoyed rich content via these networks, like images, audio, video, animation, and other multimedia content. As the number of features available in mobile devices has increased, user expectations of those devices have increased. Users now expect that much of this rich content will also be available from their mobile devices. They expect to have access on the road, in coffee shops, at home and in the office through mobile devices, to information previously available only from a personal computer that was physically connected to an appropriately provisioned network. They want news, stock quotes, and weather reports from their cell phones; email from their personal digital assistants (PDAs); up-to-date documents from their smart phones; and timely, accurate search results from all their devices.

Because displays are typically smaller on mobile devices than, for example, on desktop computers, some of the rich content designed for desktop computer users may not be effectively displayed by the mobile devices. Moreover, a typical mobile device may have less memory than a typical desktop computer, and a lower bandwidth data channel may be available to transfer data to and from a mobile device than a typical data channel that may be employed to transfer data to and from a desktop computer.

SUMMARY

In general, methods and systems are described for compressing hyperlinks within a hyperlink-based document. That is, methods and systems are described that can be used to process hyperlinks such that the hyperlinks are represented using fewer bytes after being processed than before being processed. In particular, some implementations employ a compression algorithm that reduces redundant information stored in multiple hyperlinks within a single document. The compression algorithm may be a sequential compression algorithm that receives input data and sequentially generates compressed output data based only on input data that is already received. Some implementations achieve compression efficiency by employing the compression algorithm in combination with a base link construct in the hyperlink-based document. In some implementations, hyperlinks are compressed as part of a transcoding process to, for example, modify a network-accessible document for presentation in a mobile device such as a smartphone or cell phone.

The details of one or more implementations are set forth in the accompanying drawings and in the description below. Other features, objects and advantages will be apparent from the description and drawings, and from the claims.

DESCRIPTION OF DRAWINGS

These and other aspects will now be described in detail with reference to the following drawings.

FIGS. 3A and 3B depict an example representation of hyperlinks in a network-accessible document.

FIGS. 3C and 3D depict another example representation of hyperlinks in a network-accessible document.

Like reference symbols in the various drawings indicate like elements.

DETAILED DESCRIPTION

In general, methods and systems are described for compressing hyperlinks within a hyperlink-based document. That is, methods and systems are described that can be used to process hyperlinks such that the hyperlinks are represented using fewer bytes after being processed than before being processed. In particular, some implementations employ a compression algorithm that reduces redundant information stored in multiple hyperlinks within a single document. The compression algorithm may be a sequential compression algorithm that receives input data and sequentially generates compressed output data based only on input data that is already received. Some implementations achieve compression efficiency by employing the compression algorithm in combination with a base link construct in the hyperlink-based document. In some implementations, hyperlinks are compressed as part of a transcoding process to, for example, modify a network-accessible document for presentation in a mobile device such as a smartphone or cell phone.

Figure 1:
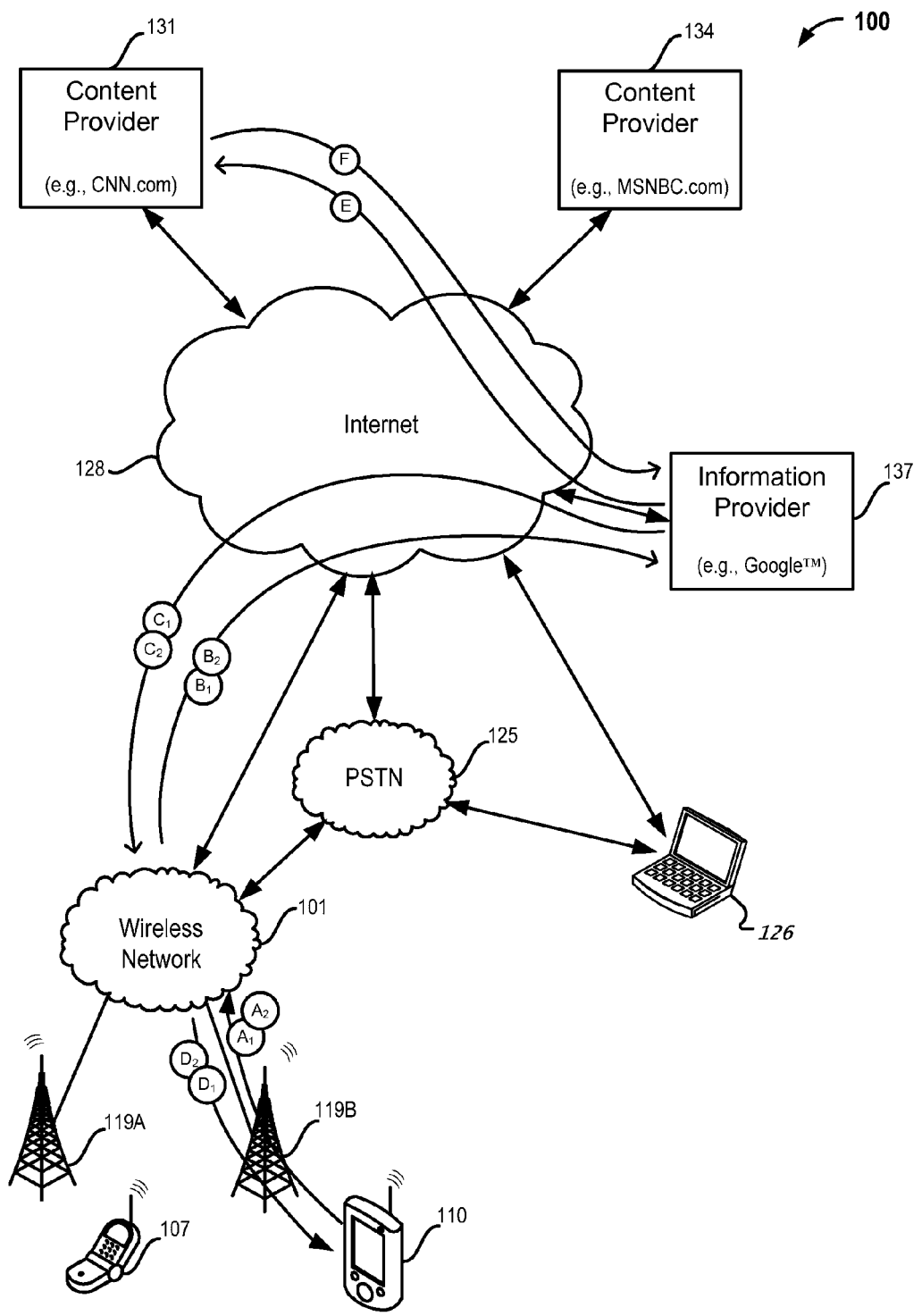
FIG. 1 is a block diagram illustrating an example environment in which network-accessible documents having hyperlinks can be accessed, transcoded and compressed.

FIG. 1 is a diagram showing an example environment 100 in which hyperlink-based, network-accessible documents can be requested by various user devices, the hyperlinks in the network-accessible documents can be compressed, and the documents having compressed hyperlinks can be provided to the requesting user devices. In particular, for example, a mobile device 110 can request a network-accessible document from an information provider 137. The information provider 137 can access the document, transcode the document for presentation in the mobile device 110, and provide the transcoded document to the mobile device 110. In some implementations, transcoding can include compressing hyperlinks that are included in the network-accessible document. Transcoding may also include breaking the document into chunks that are of a reasonable size to transmit to the mobile device 110 over a network (described in greater detail below) or that are of an appropriate size relative to available memory that is included in the mobile device 110. Transcoding may further include modifying documents that are formatted for presentation on non-mobile computing devices (e.g., desktop computers) such that that modified documents can be effectively presented by the mobile device 110, which may have limited display, input/output and memory capabilities relative to other devices.

As shown in one implementation, the environment 100 can include a wireless network 101. The wireless network can provide, for example, voice and data services to mobile devices that connect to the network 101. Data services can include, for example, providing access to internet or web content, or to content on a private network, such as a company's intranet. A variety of wireless devices can access the services provided by the wireless networks such as, for example, a wireless cellular telephone 107 and a wireless-enabled personal digital assistant (wireless PDA) 110. The wireless network 101 can service separate or overlapping geographic areas and can be a network that serves a single carrier or multiple carriers. The voice services can also be delivered as data services, such as by packetizing the voice communications in a manner similar to VoIP transmission.

The wireless network 101 can employ wireless towers 119A and 119B to provide data and voice communications and services. As shown, the wireless network 101 can connect to the public switched telephone network (PSTN) 125 and to the internet 128. The PSTN 125 can also connect to the internet 128. The networks shown in FIG. 1 are merely exemplary, and the user will appreciate that additional networks can be included or provided in place of the specific networks shown.

Other devices, such as an example computing device 126 can also connect to the internet 128, either directly, through the PSTN 125 or through a wireless connection (not shown). Through the various networks, the computing device 126 can also access information and data and content services, such as services that may be provided by content providers 131 or 134, or by the information provider 137.

In some implementations, information provided by the content providers 131 or 134 or by the information provider 137 may be formatted particularly for presentation or use by the computing device 126, or formatted differently for presentation or use by the mobile devices 107 or 110. That is, content may be formatted based on a typical screen size, amount of memory, user interface functionality and network bandwidth available to the different devices. Because mobile devices 107 and 110 may have smaller display screens, less memory, more awkward input components, and a slower-bandwidth network connection, information provided to the mobile devices 107 and 110 may be formatted in a manner that accounts for these differences (e.g., graphical information may be formatted for display on a smaller screen, user interface input may be handled in a manner that accounts for typical input component capabilities on a mobile device, information may be sent in smaller chunks than it would be sent to the computing device 126, less total data may be sent (that is, some data determined to be less important or less valuable in a mobile context may be filtered out), etc.).

In some implementations, format of data can converted from a format appropriate for the computing device 126 (e.g., a computing device with a higher-bandwidth network connection, a relatively large screen and a large amount of memory) to a format appropriate for a mobile device (e.g., a mobile device having a lower-bandwidth network connection, a relatively small screen, and a smaller amount of memory) by a transcoder, which may be included in the information provider 337. In addition to (or as part of) converting information (e.g., a network-accessible document) from one format to another, a transcoder can, in some implementations, compress hyperlinks included in the information. Compressing the hyperlinks may reduce the amount of data needed to represent the hyperlinks, which may in turn enable more data to be transmitted at one time to a mobile device than would be otherwise desirable.

Content providers 131 and 134 and an information provider 137 can also connect to the internet 128 and can be accessed by a wireless device through the wireless network 101. Exemplary content providers 131 and 134 can be online news providers like CNN.com or MSNBC.com, and the information provider 137 can include a search engine, such as Google™.

The information provider 137 can provide a various services, such as, for example, a search engine, proxy functionality or transcoding services for various devices. For example, the information provider 137 can access content from content providers 131 or 134 on behalf of a wireless device, transcode the content so that it can be effectively displayed on the wireless device, and provide the transcoded content to the wireless device. In other implementations, the information provider 137 can provide a wider array of resources and services that can include, for example, email services, forums, online shopping experiences, and other services.

The arrows labeled with letters in FIG. 1 show exemplary communication paths that can be used by the wireless PDA 110 and the information provider 137 during an exemplary session between the two. The various communication paths described below can be traversed multiple times during a single session. As an example, the user of the wireless PDA 110 can open a search application (not shown) on the wireless PDA 110 to submit a search query to the information provider 137 (e.g., an information provider, such as Google, which provides search engine functionality). The application can transmit, via paths $A_1$ and $B_1$ the search query to the information provider 137 (e.g., via the wireless network 101 and the internet 128). The information provider 137 can identify search results that are responsive to the search query (e.g., search results that include hyperlinks to information available from the content providers 131 or 134). In some implementations, the information provider 137 can determine that the search request came from a mobile device 110 and can accordingly format the search results in a manner that is appropriate for presentation in the mobile device 110, then provide the search results to the mobile device 110 via paths $C_1$ and $D_1$. The user of the mobile device 110 can select one the search results (e.g., a hyperlink to one of the search results), and this selection can cause content associated with the selected search result to be retrieved and presented in the mobile device.

In implementations in which the information provider 137 provides transcoding services and recognizes that the initial search query originated from a mobile device, the search results may include control data that causes a user selection of one of the search results to be routed back through the information provider 137 rather than redirecting the mobile device 110 to a content provider associated with the search result. In such implementations, the information provider 137 can access content associated with the search result, transcode it (e.g., by modifying its format for presentation in a mobile device and by compressing any hyperlinks included in the content), and provide the transcoded content to the mobile device. In particular, if a user of the mobile device 110 selects a search result associated with content provided by the content provider 131, the selection can be transmitted to the information provider 137 via paths $A_2$ and $B_2$, the information provider 137 can obtain the content (e.g., via paths E and F), transcode the retrieved content (e.g., internal to the information provider 137; not depicted in FIG. 1), and provide the transcoded content to the mobile device via paths $C_2$ and $D_2$.

Figure 2:
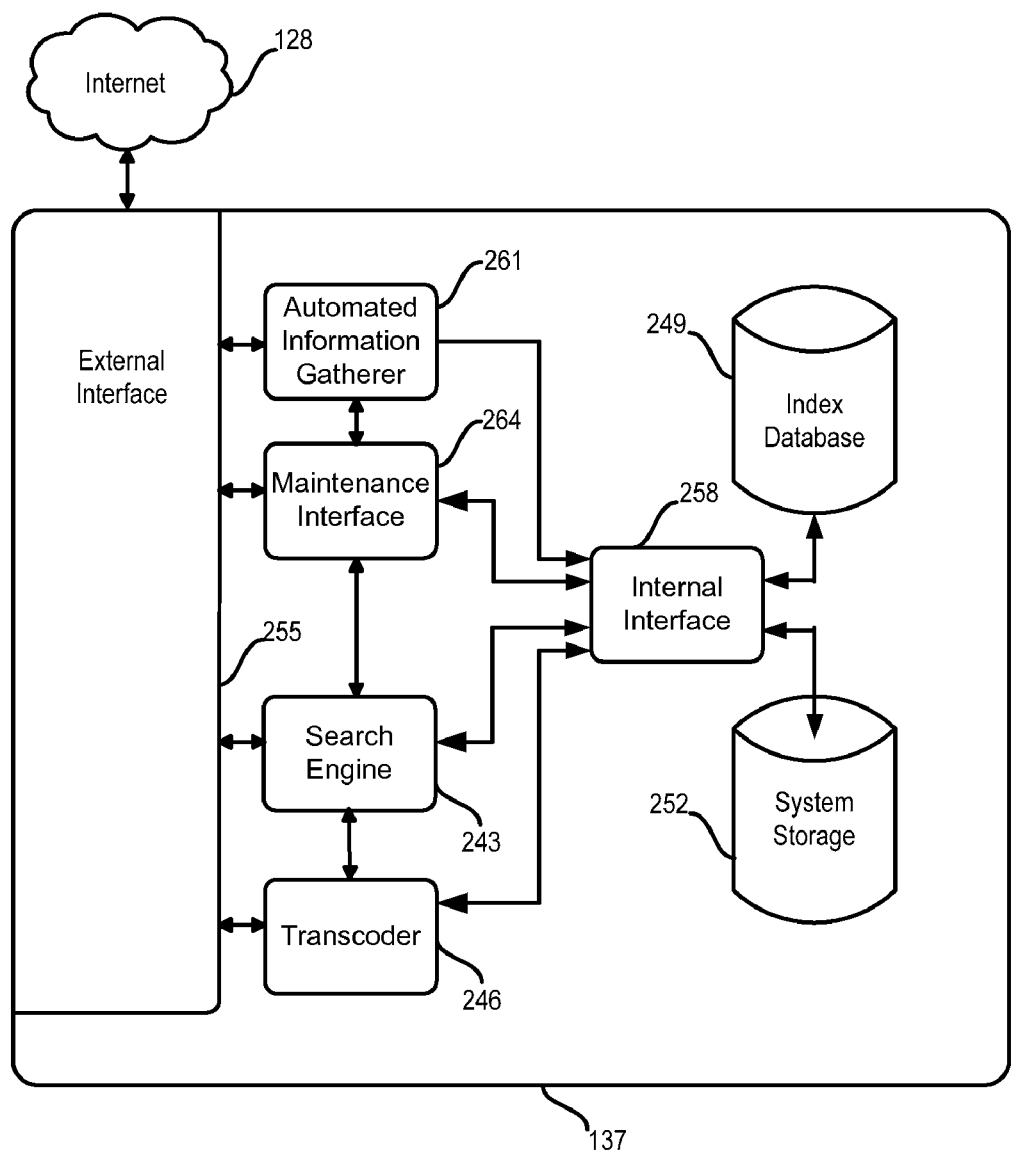
FIG. 2 is a block diagram illustrating additional details of the example information provider shown in FIG. 1.

FIG. 2 is a schematic diagram showing additional details of the exemplary information provider 137 that is shown in FIG. 1. The information provider 137 can receive requests for data from users and generate responses to those requests. In some implementations, the information provider 137 includes a search engine 243 (e.g., an internet search engine). In some implementations, the information provider 137 provides information such as real-time traffic information, weather forecasts, news, or real-time stock quotes. The information can include text, graphics, animations, audio, video, or other appropriate information. The information provider 137 can further include a transcoder 246 to convert information from one format to another and to compress hyperlinks within network-accessible content that can be located by the search engine 243.

As shown, the information provider 137 is connected to the internet 128 to communicate with users who access the services provided by the information provider 137. The information provider 137 can also be connected to other networks (not shown), such as, for example, an internal company network, or a local wireless communication network. The information provider 137 can be divided into separate systems to allow for scalability, data integrity, or data security, and it can be connected to the internet 128 or to another network in any of a variety of ways, as is commonly known.

The exemplary information provider 137 includes an index database 249, and system storage 252. The index database 249 can include data that represents information that the information provider 137 provides to users. For example, as indicated above, the information provider 137 can include a typical internet search engine 243, and the index database 249 can include links to information stored on the internet (e.g., outside of the information provider 137). When a user selects a link, the information to which the link points can be provided. As another example, some information referenced by entries in the index database 249 can be stored in the system storage 252. For example, the system storage 252 can "mirror" information for which search reports are regularly received—such as, for example, breaking news stories or weather or traffic information. The system storage 252 can also store various components needed for general operation of various components of the information provider 137, such as applications, system parameters and information about users who access the system.

The index database 249 may or may not be cached. For example, the index database 249 can include a separate cached index database (not shown) to support faster access to search results. The system storage 252 can be local to the information provider 137, or it can be distributed, such as, for example, in an external server or storage farm (not shown). Within the information provider 137, the search engine 243 can operate to produce search results that include information stored in the index database 249 or the system storage 252, in response to search requests from users.

As shown, the information provider 137 communicates through an external interface 255 and through an internal interface 258. Through the external interface 255, which can include one or more Web servers, the information provider 137 can receive requests and transmit responses. Through the internal interface 258, the information provider 137 can internally route information to and from the index database 249 and system storage 252. These interfaces are shown as distinct interfaces, but they can be partially or fully combined, or they may include additional interfaces. As an example, the internal interface 258 can include interface devices for a high-speed, high-bandwidth network such as SONET, Infiniband or Ethernet, or any suitable communication hardware operating under an appropriate protocol such that the information provider 137 can respond to a large number of distinct requests simultaneously. The external interface 255 can include network interface cards (NICs) or other communication devices and can similarly include components or interfaces of a high-speed, high-bandwidth network. The precise design of the information provider 137 is not critical to this disclosure and may take any suitable form.

An automated information gatherer 261, such as, for example, a crawler or a spider, can gather information in the index database 249. The information gatherer 261 can continuously or almost continuously obtain new information from sources connected to the internet 128 or to other network(s) connected to the information provider 137. The automated information gatherer 261 can also retrieve content in response to a search query. This information can be provided to the index database 249 or to the system storage 252, or to both. The index database 249 can index data that is accessible from the internet 128 or from another network. In addition to being added to the index database 249 or system storage 252 in an automated fashion, information can also be manually loaded in or retrieved from the index database 249 or the system storage 252 through a maintenance interface 264. For example, the maintenance interface 264 can allow an administrator of the information provider 137 to manually add bulk data to the index database 249 or to the system storage 252.

Data requests, such as data requests from users, can be received and processed through the external interface 255. For example, the external interface 255 can parse requests, and, if necessary, reformat them (e.g., from HTML (hypertext markup language) or text format, to search terms or strings that are compatible with the search engine 243).

The information generated by the search engine 249 in response to a request can be converted to another format by a transcoder 246 in a manner that allows it to be used or displayed by the requesting device. For example, the transcoder 246 can compress hyperlinks included in content identified by the search engine 249, such as in the manner described in more detail below. As another example, the transcodes 246 can convert content from one format to another (e.g., from a format appropriate for presentation in a device having a large display screen and expansive input capabilities to a format appropriate for presentation in a device having a small display screen and more limited input capabilities. The transcoder can perform other functions as well (e.g., converting HTML to XHTML, replacing ad content with substitute ad content, collapsing or expanding navigational menus, reformatting the overall appearance of content, etc.).

A more detailed discussion of example hyperlink compression algorithms is now provided. Various compression algorithms are available for compressing, for example, text or image content. Some algorithms receive a stream or block of input data (e.g., text) to compress the data to remove redundant information, and output compressed data. Generally, the compressed data is more efficiently represented than the input data. That is, the compressed data may be stored in electronic form using fewer bytes of data than the input data.

Various kinds of human-discernable information (e.g., text or image data) can be represented in electronic form based on different methods of encoding the data. In some implementations, individual characters of text data can be represented as blocks of binary data. The number of bits in the block and the manner of encoding can depend on the method of encoding. For example, a base-64 representation of text encodes individual text characters as a six-bit binary number. With six bits, base-64 encoding can represent 64 unique text characters, which generally include letters A-Z and a-z, numbers 0-9, and two other characters (e.g., punctuation marks, which may vary between different base-64 instantiations. As another example, an ASCII (American Standard Code for Information Interchange) character representation uses seven bits to represent 128 different letters, numbers, punctuation symbols, and control codes. As another example, UTF-8 (8-bit UCS (Universal Character Set)/Unicode Transformation Format) employs between one to four bytes to represent virtually any letter or character in any written language.

Some compression algorithms compress data by combining multiple characters into groups and re-coding the groups in a manner that eliminates some of the redundancy in the original data. For example, some compression algorithms analyze text data on a word-basis. Other compression algorithms analyze text data two or three characters at a time. For purposes of example, compression will be further described in the context or re-coding based on words, but the effect is the same—each unit of information (word, two-character grouping, three-character grouping, etc.)—can be re-coded in a manner that requires less storage space (e.g., fewer bits or bytes) to encode than is required to encode the individual characters that make up the unit.

In some implementations, the re-coding process includes analyzing an input block of data to identify individual words in the input block (or other units of data as described above), building a "dictionary" based on unique identified words, and storing references to the dictionary to eliminate some of the redundancy, rather than storing repeated words multiple times. Thus, the output of such a compression algorithm can be the dictionary itself, followed by references to the dictionary. In some implementations, the dictionary is disposed at the beginning of the compressed data and is followed by a sequence of references to the dictionary.

Some block-based compression algorithms analyze an entire block of data and compress the block of data (e.g., build a dictionary) based on information at any location in the block. That is, such block-based compression algorithms can "look ahead," and may make several passes through the block of data before outputting corresponding compressed data. In contrast, some stream-based or sequential algorithms make a single pass through the data and compress data (e.g., build a dictionary) based only on the single pass through the data. That is, such algorithms may not look ahead, but rather may compress data based only on previous data that the algorithm has already encountered. With this background, a concrete example is provided to further illustrate.

One version of the nursery rhyme "Peter Piper" is as follows:

TABLE 1

Example data to be compressed

Peter Piper picked a peck of pickled peppers,
A peck of pickled peppers Peter Piper picked.
If Peter Piper picked a peck of pickled peppers,
How many pickled peppers did Peter Piper pick?

An example sequential compression algorithm may process each word in the rhyme by determining if the word is in the algorithm's dictionary. If the word is in the dictionary, a reference to the dictionary entry is made; if the word is not in the dictionary, it is first added to the dictionary, then a reference is made to the dictionary. Starting with the first word "Peter," the algorithm determines that the dictionary has not yet been populated; the algorithm may add "Peter" as an entry to the dictionary and assign a reference to the entry (as described below). The algorithm next encounters the space, determines that it is not in the dictionary, adds an entry to the dictionary for the space, and makes a reference to this second entry. The process continues with "Piper." When the algorithm reaches the second space, a reference is simply added to the sequence of dictionary references, since a space is already stored in the dictionary. When the algorithm is finished, compressed data may have the form of a dictionary, followed by a sequence of references to the dictionary.

The amount of data needed to store a reference to a dictionary entry can depend on how many entries are stored in the dictionary. For example, if there are only sixteen entries or less in the dictionary, each entry can be represented by four binary digits (one hexadecimal digit); if there are 128 entries in the dictionary, seven digits would be needed for each reference. With reference to the Peter Piper example above, a compressed version may be encoded as shown below. In this case, given the redundancy, the dictionary is quite small, and references to the dictionary can be specified by a single Hexadecimal character (represented as 0xN, where N is 0-9, A, B, C, D, E, or F to represent 0-15 in base-16). For simplicity, the spaces and other punctuation are omitted in the example below, but the reader will appreciate that they can be encoded just like the other entries in the dictionary.

TABLE 2

Example compress data from table 1,
using a dictionary and references to the dictionary

| Dictionary | |
|---|---|
| Peter | 0x0 |
| Piper | 0x1 |
| Picked | 0x2 |
| A | 0x3 |
| Peck | 0x4 |
| Of | 0x5 |
| Pickled | 0x6 |
| Peppers | 0x7 |
| If | 0x8 |
| How | 0x9 |
| Many | 0xA |
| Did | 0xB |
| pick | 0xC |
| References to dictionary | |
| 0x0123456734567012801234567 9A67B01 C | |

In this example, 33 references are made to the dictionary. If each reference requires four bits (to represent a single hexadecimal digit), a total of 17 bytes are required to reference the dictionary. If each character and character code in the dictionary is also represented by a byte, and one additional byte is required to delineate each row of the dictionary from the rest of the dictionary and from the dictionary references, the dictionary requires an additional 79 bytes. Thus, in this example, with compression, the compressed data (e.g., dictionary and sequence of dictionary references) can be represented in 96 bytes. In contrast, if one byte is used to represent each character in the original input data (148 characters, excluding spaces and punctuation to be consistent with the above dictionary example, 148 bytes would be required to represent the uncompressed input data. Thus, 35% fewer bytes are required in this example to store a compressed version of the nursery rhyme, where the compressed version employs a dictionary.

The above example is merely illustrates conceptually one method of compression. The efficiency of a compression generally (e.g., the reduction in data required to represent the input data in compressed form rather than uncompressed form) may depend on the dictionary size, the length of the input data (shorter blocks of input data may actually be larger when "compressed," if the amount of input data is small relative to the overhead required to build a dictionary) and the amount redundancy in the input data.

In some implementations, compression algorithms can be applied to hyperlinks on a hyperlink-based, network-accessible document, such as a web page, in order to reduce the amount of information to represent the network-accessible document. In certain applications, such compression can be particularly advantageous, especially when the network-accessible document is primarily a text document, and hyperlinks make up a significant portion of the document. Further background illustrating an example context in which hyperlinks can be compressed is now provided with reference to FIGS. 3A-3D.

FIGS. 3A and 3B depict an example representation of hyperlinks in a network-accessible document 305. As shown in one implementation, the network-accessible document 305 (referred to hereafter as the web page 305) includes text (represented by a sequence of tilde characters) and a number of hyperlinks, including hyperlink 308A and its corresponding URL 308B (Uniform Resource Locator). The hyperlink 308A represents the display version of the hyperlink; the corresponding URL 308B represents the location that a browser displaying the web document 305 will navigate to, upon receiving input selecting the hyperlink 308A. Other URLs 311B, 314B and 317B are also shown, which correspond to other hyperlinks included in the web document 305.

FIG. 3B illustrates example markup code (HTML, or HyperText Markup Language, code is shown) that may correspond to the web document 305. As depicted in the example of FIG. 3B, each hyperlink can be represented by an anchor tag, consisting of an open anchor tag (<a>) and a closing anchor tag (</a>). Between the open and closing tags, a URL can be provided, using an "href" tag, and associated with the anchor. That is, the anchor can be made into a hyperlink when an "href" tag is included between the open and closing anchor tags. In many implementations, the "href" tag is followed by the full URL (e.g., 308B) and display text (e.g., 308A) to display in the web document 305.

As depicted in FIGS. 3A and 3B, much of the information in the hyperlinks is redundant, which may be typical of a web page having many different hyperlinks. For example, each of the four hyperlinks shown (that is, the underlying URL information included in each hyperlink) includes "http://www.", ".html", and ".com"; three of the four links include "firstsite"; and two of the links include "directory1." By compressing this information (e.g., by removing some of the redundant information), the hyperlinks in the web document 305 may be represented using less information (e.g., fewer bytes) than is required to represent the hyperlinks in uncompressed form.

Some implementations employ an HTML construct that may be referred to as a base tag to achieve some level of compression of hyperlinks, as is now described with reference to FIGS. 3C and 3D. FIG. 3C depicts the web document 305, shown in FIG. 3A, and FIG. 3D depicts different example HTML code than is shown in FIG. 3B and that can correspond to the web document 305. With reference to FIG. 3D, the HTML code can include a base tag ("<base>") that can specify a prefix or base portion for hyperlinks within the page that are not otherwise fully specified (e.g., that do already include an absolute reference starting with "http://"—sometimes referred to as relative links). That is, if the URL information corresponding to a hyperlink is fully provided (e.g., an absolute hyperlink), that URL information can be employed by a browser to obtain another network-accessible document when the corresponding hyperlink is selected. If, on the other hand, URL information corresponding to a hyperlink that is not fully provided (e.g., URL information that does not start with "http://"), the browser can concatenate the base portion with the relative link.

A detailed example of concatenation is now provided. If a user selects the hyperlink 308A, shown in FIG. 3C, the browser can determine that the corresponding URL information 308D is not a fully specified URL, and the browser can further determine that a base portion is provided (e.g., by inclusion of the <base> tag shown in FIG. 3D). After making this determination, the browser can concatenate the base portion 308C ("http://www.firstsight.com") with the URL information 308D ("directory1/page1.html") that is associated with the hyperlink 308A, and the browser can then retrieve and display information corresponding to the full URL ("http://www.firstsite.com/directory1/page1.html").

As described above, use of a base link can provide some amount of compression, if large portions of a number of different links have common prefix elements. In particular, in the above example, use of a base can be employed to at least remove redundancy associated with the three links that start with "http://www.firstsite.com". Some redundancy may remain, even if a base link is employed. For example, referring again to FIG. 3C, two links still include "directory1" and ".html," and another link includes "http://", "www.", ".com" and ".html".

Methods and systems described herein may provide an additional level of compression, which may compress portions of URLs that fall outside a prefix region. In particular, in some implementations, multiple hyperlinks in a web page can be concatenated together, compressed and stored as base link (e.g., the base link 308C shown in FIG. 3D). Individual hyperlinks within the web page can be concatenated with the base link, again compressed, and the base link portion of the compressed, concatenated link can be removed and what is left can be stored as a relative link.

Conceptually, such implementations can be described in another manner. In particular, in a web page having four hyperlinks—A, B, C and D—the four hyperlinks can be concatenated together to a concatenated group of hyperlinks ABCD (e.g., a compression seed). This concatenated group can be compressed (e.g., using a sequential, dictionary-based compression algorithm) to form a compressed seed. For purposes of illustration, the compressed version of ABCD is referred to as X'. To compress each individual hyperlink, the hyperlink can be concatenated to the compressed base, and the new concatenated compressed base and link can again be compressed. In particular, to compress hyperlink A, A can be concatenated to X' to form X'A, and X'A can again be compressed, using the same algorithm as was used to form X' to form compressed X'A. (Alternatively, A can be concatenated with compression seed ABCD (to form ABCDA), and the concatenation can be compressed once, as a whole.) By using the same algorithm, assuming a sequential (e.g., backward-looking-only compression algorithm), the compressed base (X') may already have a dictionary with elements of A. Accordingly X'A may compress very compactly (that is, the incremental difference between data needed to represent X' and data needed to represent X'A may be very small). The base portion of the compressed X'A can subsequently be removed, leaving a very compact, compressed representation of A (A' for the sake of example).

A more detailed example with reference to the hyperlinks shown in FIG. 3A further illustrates the above conceptual example and is described with reference to FIG. 3E.

If the links shown in FIG. 3A (http://www.firstsite.com/directory1/page1.html, http://www.firstsite.com/page3.html, http://www.firstsite.com/directory1/page2.html, and http://www.secondsite.com/pageA.html) are concatenated to form a concatenated string of hyperlinks 331 and compressed using a sequential, dictionary-based compression algorithm as described above in the Peter Piper example, a dictionary 334 and representation 337 of the concatenated string of hyperlinks 331 may result. The dictionary 334 and the representation 337 can be stored as a base link (e.g., in place of the base link 308C, shown in FIG. 3D).

In one implementation, as shown, individual links can be compressed by concatenating the representation 337 with the link 308B being compressed to form a concatenated compressed base and link (shown with the text portion of the URL for link 308B as element 340A, and with the corresponding dictionary references in element 340B). In some implementations, the base portion 337 of the compressed concatenated base and link can be removed, leaving only a compressed relative link 343. This compressed relative link 343 can then be stored, as a relevant link, in the network accessible document.

A second compressed link is also illustrated. In particular, representation 337 can be concatenated with the link 317B and compressed to form a concatenated compressed base and link 346A (shown with the text portion of the URL) or 346B (shown compressed, with references to the dictionary). The base portion of the compressed concatenated base and link can be subsequently removed, leaving only a compressed link 349.

Figure 3E:
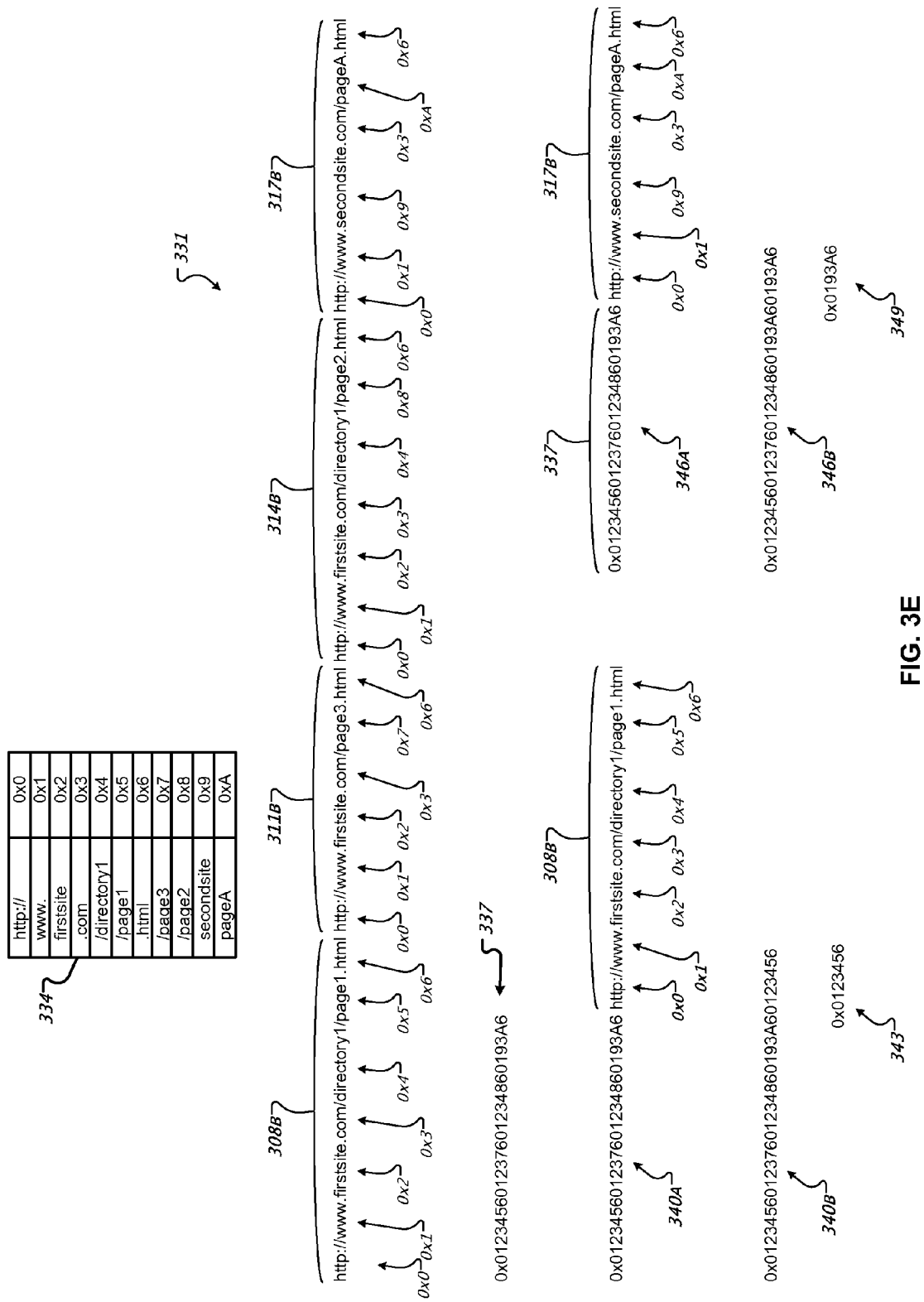
FIG. 3E illustrates example details of one implementation of hyperlink compression.

As shown in FIG. 3E and described above, compression can be provided in some implementations for multiple hyperlinks, even if the multiple hyperlinks do not share a common prefix. Accordingly, by combining a compression algorithm with the above method of concatenating hyperlinks, compressing the concatenated hyperlinks, and storing the compressed concatenated hyperlinks as a base tag for a web page, additional compression may be realized over the traditional use of a base tag as described with reference to FIGS. 3C and 3D.

In some implementations, additional information is stored in the base link (e.g., 308C), such as information that is necessary to enable a system to interpret hyperlinks that are relative to the base link. In particular, since the base link may be fully compressed, a reference to a server or other site that is capable of decompressing the base tag 308C and any specific link that is selected may be prepended to the base link. For example, in some implementations, the base link has the form: http://www[server].com/[server flags or switches] [compressed base]. In other implementations, version information is included (e.g., for future backwards compatibility). Additional details are now described with reference to FIG. 4.

Figure 4:
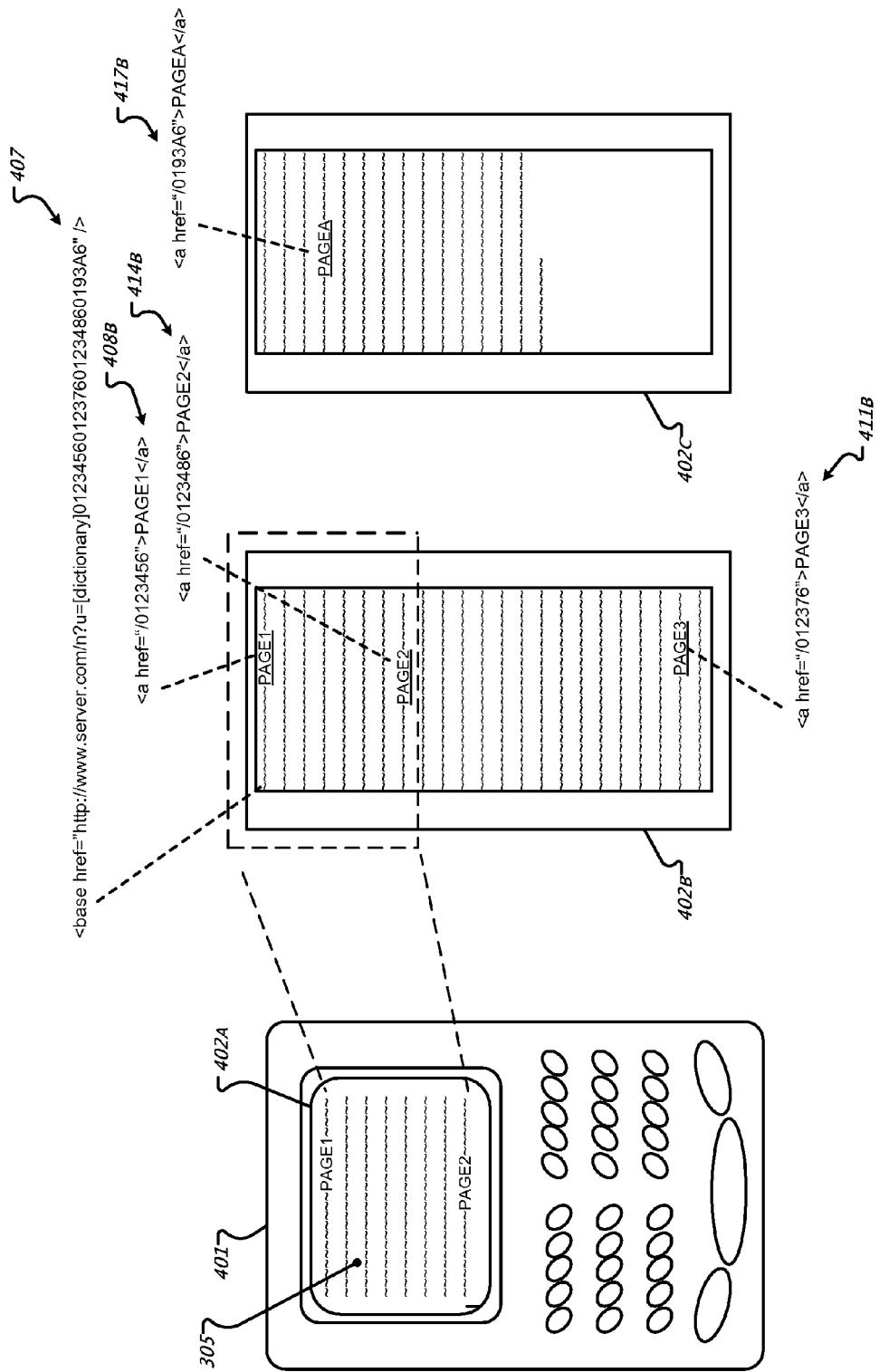
FIG. 4 illustrates additional example details of one implementation of hyperlink compression.

FIG. 4 illustrates additional details of the web document 305 having the compressed hyperlinks that are shown in FIG. 3E, as it may be displayed on a mobile device 401. As shown in view 402A, a portion of the web document 305 is visible on the screen of the mobile device 401. More of the web document 305 than is displayed at one time by the mobile device 401 may be immediately available (e.g., one page or "chunk" of the web document 305) to the user in response to user input such as a page-down command or a scroll command. That is, although only a portion of the web document 305 can be displayed on the screen of the mobile device 401, all of the information depicted in view 402B may be immediately available. If the web document 305 is larger than what is shown in view 402B, additional portions or chunks may be accessible from a server that provides the web document 305. In particular, for example, if the mobile device 401 receives a page-down command or scroll command when a user is viewing information at the bottom of the view 402B, the mobile device can request the additional content, and receive that additional content in a separate network transaction. By breaking a large web document 305 into multiple pages 402B and 402C, the server or other device providing the web document 305 can optimize the amount of information delivered to the mobile device at one time with the network bandwidth (and the corresponding time required to deliver that content). In some implementations, hyperlinks are compressed for each page 402B or 402C when that page is generated and provided.

In some implementations, the amount of information that can be included in a single page 402B or 402C can be increased when hyperlinks on the pages 402B and 402C are compressed. This may be particularly true when the pages 402B and 402C of the web document 305 primarily include text and a large number of hyperlinks within the text—especially when the information needed to represent the large number of hyperlinks is redundant (e.g., when a large number of hyperlinks have many common elements). In such implementations, more information can be delivered to the user at one time than may be possible if hyperlinks were not compressed, and this can lead to greater user satisfaction.

Additional details are now provided with respect to an example compressed hyperlink. If a user of the mobile device 401 selects the hyperlink 408B displayed as "PAGE2," a browser running on the mobile device 401 can determine that the underlying URL information corresponding to the link 408B is relative (since it does not fully specify a network-accessible location or document). Accordingly, the browser can identify a base link 408C to which to append the relative link 407 information. In this example, the full resulting URL information associated with the link 408B is http://www.server.com/n?u=[dictionary] 012345601237601234860193A60123456. The browser can employ this full resulting URL to retrieve content associated with the link 408B. Based on the server information (e.g., "http://www.server.com") and server switch information (e.g., "/n?u="), the compressed URL information (e.g., the dictionary and subsequent references to the dictionary) can be provided to an appropriate application on the server, which can uncompress the URL information (e.g., to http://www-.firstsite.com/directory1/page1.html) and retrieve the corresponding information.

In some implementations, longer base links can result in greater compression of hyperlinks that refer to the base. That is, the more information about hyperlinks in a web document that is included in the base, the more likely it may be that each hyperlink will be efficiently compressed, since the dictionary constructed in the process of compressing the base link will be more likely to already have many of the components included in the hyperlink being compressed.

In some implementations, base links are limited in length. For example, a browser may limit the base link to 2048 characters, 8190 characters, or some other number of characters. To allow for longer base links, full base link information can be stored on a server, and the base link on a web page that is provided to a mobile device can be a reference to the full base link information stored on the server. In such implementations, the server can concatenate the full base link information and the hyperlink information and decompress both.

In the above examples, the compressed base link has been described as including hyperlinks that are in the document being transcoded or compressed. In some implementations, all of the hyperlinks in the document are included in the compressed base link. In other implementations, only a portion of the hyperlinks are included in the compressed base link (or portions of one or more hyperlinks). In some implementations, other information is included in the compressed base link that may or may not be at all directly related to any of the hyperlinks that are being compressed in a particular network-accessible document. For example, in some implementations, common components of hyperlinks, or common URLs can be used to "pre-seed" the compression algorithm. That is, common components can be used to create a compression seed, which, when compressed, will build an initial dictionary that may be useful for efficiently compressing a variety of hyperlinks. In particular, for example, the common components could include "http://", "www", ".com", "html", "myspace", "youtube", and other components (e.g., common two- and three-letter combinations) that are determined to be included in a large number of network-accessible documents that are transcoded.

In some implementations, pre-seeding the compression algorithm as described above can yield some transcoding efficiency gains by providing a uniform "compression seed" that can be compressed and stored as a base link in a large number of network-accessible documents that are subsequently transcoded. Employing a uniform compression seed can eliminate, in some implementations, an analysis step that may otherwise be required to build a concatenated list of hyperlinks from which to generate the base link.

Figure 5:
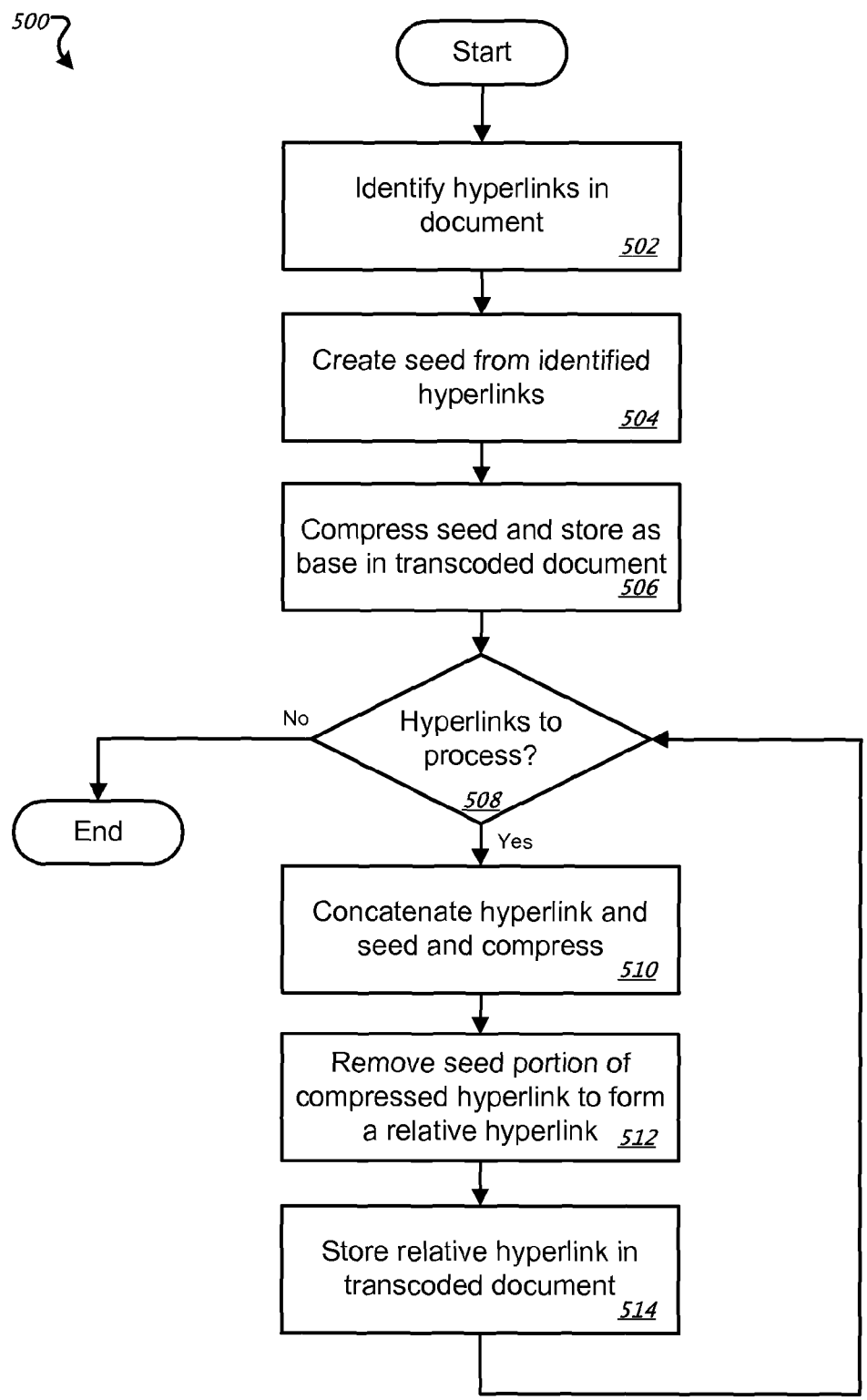
FIG. 5 is a flow diagram of an example method of compressing hyperlinks in a network-accessible document.

FIG. 5 is a flow diagram of an example method 500 of compressing hyperlinks in a network-accessible document. As shown in one implementation, the method includes identifying (502) hyperlinks in the document (e.g., the document to transcode). For example, with reference to FIGS. 3A and 3E, the method 500 can include identifying the links 308B, 311B, 314B and 317B included in the web page 305.

The method 500 can include creating (504) a seed from the identified hyperlinks. In this context, a seed can include information that is used to influence how a compression algorithm compresses data, and in particular, how a sequential compression algorithm builds its dictionary. With reference to FIG. 3E, creating (504) the seed can include concatenating the identified (502) hyperlinks to form a string 331 of concatenated hyperlinks (e.g., a compression seed).

The method can include compressing (506) the seed (e.g., the compression seed, or string of hyperlinks) and storing the compressed seed as a base link in a network-accessible document whose hyperlinks are being compressed. For example, with continued reference to FIG. 3E, application of the compression algorithm can create the dictionary 334 and a sequence of references 337 to the dictionary. Together, the dictionary 334 and the sequence 337 can make up the compressed seed, which can be stored as the base link (see, as examples, hyperlink 308C in FIG. 3D and base link 406 in FIG. 3E).

The method can determine (508) if there are hyperlinks to process in the network-accessible document (e.g., hyperlinks that have not already been processed). For each hyperlink that has not been processed, the method 501 can include concatenating (510) the hyperlink and the compression seed, and compressing (510) both. For example, as depicted in FIG. 3E, the hyperlink 308B can be concatenated with the compressed seed 340A (or in other implementations, which are not shown, the compression seed 331). The same compression algorithm used to create the compressed seed from the compression seed can be applied to the concatenated hyperlink and seed to create a compressed hyperlink (e.g., compressed hyperlink 340B, shown in FIG. 3E).

In the case of a sequential backward-looking-only compression algorithm, compression of the hyperlink as described above can result in a compressed hyperlink having a seed portion (e.g., 0x012345601237601234860193A6) corresponding to the compression seed and a hyperlink portion (e.g., 0x0123456). The seed portions may be common to all hyperlinks and may, accordingly, be removed (512) from each compressed hyperlink. For example, as shown in FIG. 3E, the seed portion 340B can be removed, leaving a compressed relative hyperlink (such as the relative compressed hyperlink 343). The compressed relative hyperlink can then be stored (514) in the transcoded document, for example, as depicted by element 408B in FIG. 4. The above-described method 501 can be repeated until it is determined (508) that there are no more hyperlinks to process.

Figure 6:
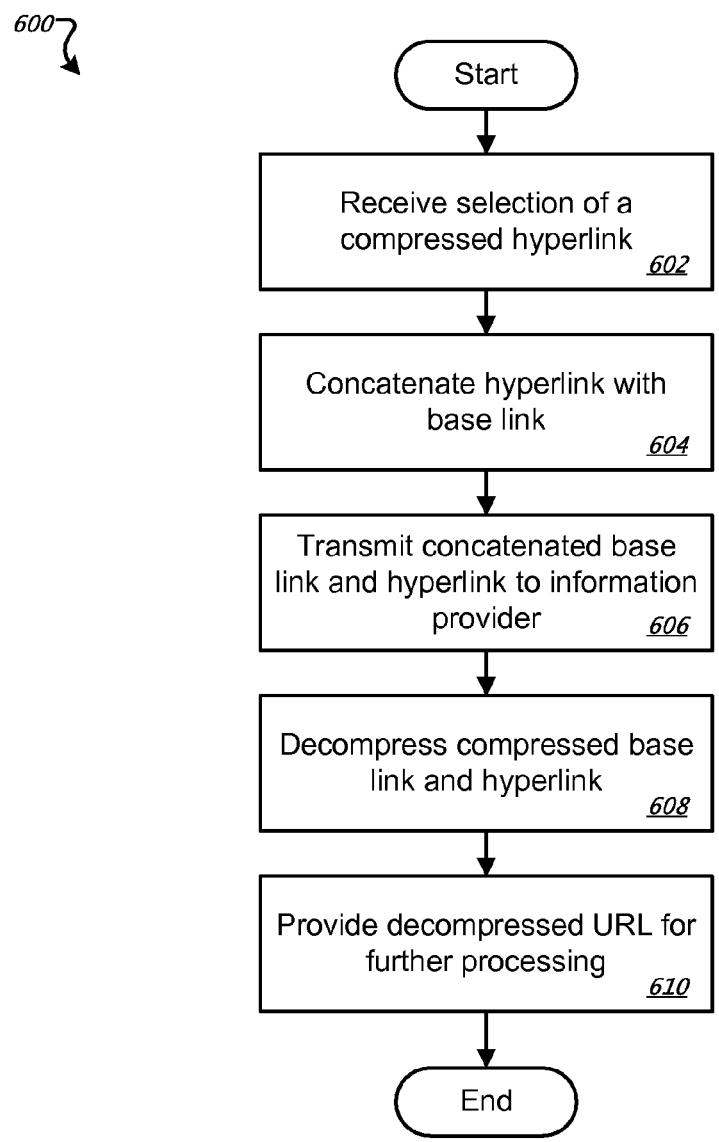
FIG. 6 is a flow diagram of an example method of decompressing a hyperlink.

FIG. 6 is a flow diagram of an example method 601 of decompressing a hyperlink. The method 601 includes receiving (602) selection of a compressed hyperlink. For example, with reference to FIG. 4, the mobile device 401 can receive user input corresponding to selection of the "PAGE2" link 414B.

The method 601 can include concatenating (604) the selected hyperlink with a base link associated with the network-accessible document. For example, with reference to FIG. 4, selection of the hyperlink associated with "PAGE2" can cause the underlying compressed hyperlink 414B to be appended to the compressed base link 407.

The method 601 can include transmitting (606) the concatenated (604) hyperlink and base link to an information provider (e.g., the information provider from which the network-accessible document having the compressed hyperlinks was provided). For example, with reference to FIG. 1, selection of a compressed hyperlink in a network-accessible document displayed in the mobile device 110 can cause the concatenated base link and hyperlink to be transmitted to the information provider 137. In particular, in some implementations, the concatenated base link and hyperlink are transmitted to a decompression algorithm included in the transcoder (e.g., the transcoder 246, shown in FIG. 2).

In some implementations, where the concatenated base link and hyperlink is sent depends on information included within the base link. For example, with reference to FIG. 4, additional information (e.g., "www.server.com" and "n?u=" can determine a destination sever or process and processing flags for decompressing the selected hyperlink.

In some implementations, the concatenation (604) occurs within the mobile device, as suggested above. In other implementations, the concatenation (604) is performed within the specified server or other location. In particular, in implementations in which the base link is stored on the server (e.g., because it is too long to be stored in the network-accessible document that includes the hyperlink), only the hyperlink may be transmitted (606) to the server (e.g., information provider), and the concatenation (604) can occur at the server.

Once concatenated (604), the dictionary included in the base link can be employed to decompress (608) the base link itself and the appended (concatenated) hyperlink. The decompressed (608) base link and hyperlink (e.g., URL) can be provided (610) for other processing. For example, the decompressed URL can be used to obtain other information or another network-accessible document that was reference by the original, uncompressed hyperlink.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable media that store machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. The systems and methods described herein may be implemented in many different devices, networks and systems. In addition, the logic flows depicted in the figures may not require the particular order shown, or sequential order, to achieve desirable results. Other steps may be provided, or steps may be eliminated, from the described flows, and other components may be added to, or removed from, the described systems. In particular, for example, in some implementations, transcoding can include converting all content to a base-64 representation, to an ASCII format, or to some other format. For the sake of example, network-accessible documents that are transmitted by way of HyperText Transfer Protocol (HTTP, as signified by "http://") have been illustrated and described. The systems and methods may be applied to network-accessible documents that are transmitted using other protocols, such as, for example, File Transfer Protocol (ftp://). Moreover, HTML documents are exemplary, but other markup language-based documents can be employed (or non-markup language-based documents or code). Furthermore, the principles described herein can be applied to network-accessible documents that are stored in domains other than "www" (e.g., "www2", "www3", "online", or on corporate networks). Web pages are specifically mentioned, but other kinds of network-accessible documents can also employ the methods and systems described herein. Compression algorithms can be executed by an information provider server, by the device (e.g., the mobile device) that displays the network-accessible document having compressed hyperlinks, or by a combination of both. Network-accessible documents have been discussed as an example set of documents that frequently contain hyperlinks. However, the methods and systems described herein can be applied to other documents having hyperlinks, whether or not those documents are network-accessible. Specific example methods are illustrated in and described with reference to FIGS. 5 and 6, but numerous variations are described throughout this document, and the reader will appreciate that the example methods shown in FIGS. 5 and 6 can be modified in various ways in view of the variations. Accordingly, other implementations may be within the scope of the following claims.

What is claimed is:

1. A computer-implemented method comprising:
   accessing, by a computer system, a plurality of documents that each include a plurality of hyperlinks;
   identifying, for one document of the plurality of documents, portions of the plurality of hyperlinks of the one document;
   adding, for the one document, the identified portions of the plurality of hyperlinks as entries to a dictionary along with an associated reference for each of the added entries, wherein the dictionary and associated references for the one document are different than dictionaries and associated references for other documents of the plurality of documents, and wherein each associated reference defines a shortened representation for an entry in the dictionary that corresponds to the reference;
   compressing, by the computer system, each of the plurality of hyperlinks of the one document by replacing portions of the plurality of hyperlinks of the one document that are provided by entries in the dictionary for the one document with corresponding references to the entries in the dictionary;
   modifying the one document to include the dictionary and the associated references for the one document as a base hyperlink and replacing the plurality of hyperlinks of the one document with corresponding compressed hyperlinks; and
   providing the modified one document to a computing device for presentation to a user of the computing device.

2. The computer-implemented method of claim 1, wherein the dictionary and the associated references for the one document are created by concatenating the one or more of the plurality of hyperlinks of the one document together and identifying unique portions of the concatenated hyperlinks with a single-pass through the concatenated hyperlinks.

3. The computer-implemented method of claim 2, wherein the dictionary and associated references are created using at least two, and fewer than all, of the plurality of hyperlinks of the one document concatenated together.

4. The computer-implemented method of claim 1, further comprising receiving selection input from the computing device, the selection input identifying one of the compressed hyperlinks that has been selected.

5. The computer-implemented method of claim 4, further comprising decompressing the one identified compressed hyperlink.

6. The computer-implemented method of claim 5, wherein the one identified compressed hyperlink includes the dictionary and the associated references for the one document, and wherein decompressing the one identified compressed hyperlink comprises concatenating the associated references and the one identified compressed hyperlink together, and decompressing the concatenated references and compressed hyperlink using the dictionary for the one document.

7. The computer-implemented method of claim 5, further comprising obtaining an additional document corresponding to the decompressed hyperlink and providing the additional document to the computing device.

8. The computer-implemented method of claim 1, wherein each of the entries in the dictionary for the one document comprises a plurality of characters.

9. The computer-implemented method of claim 1, further comprising, before adding the portions as entries to the dictionary, pre-populating the dictionary for the one document with terms that are determined to occur frequently in hyperlinks.

10. The computer-implemented method of claim 9, wherein the terms are determined to occur frequently in hyperlinks by determining that each of the terms has at least a threshold frequency of occurrence in electronic documents that have been previously accessed by the computer system.

11. The computer-implemented method of claim 1, wherein each of the associated references is represented by a fixed number of bits of data.

12. A computer-implemented method comprising:
accessing, by a computer system, a plurality of network-accessible documents that each include a plurality of hyperlinks;
producing, by the computer system for one document of the plurality of network-accessible documents, a transcoded document from the network-accessible document; and
providing the transcoded document to a computing device for presentation to a user of the computing device;
wherein producing the transcoded document comprises a) identifying, for the one document, portions of the plurality of hyperlinks of the one document; b) adding, for the one document, the identified portions of the plurality of hyperlinks as entries to a dictionary along with an associated reference for each of the added entries, wherein the dictionary and associated references for the one document are different than dictionaries and associated references for other documents of the plurality of documents, and wherein each associated reference defines a shortened representation for an entry in the dictionary that corresponds to the reference; c) compressing each of the plurality of hyperlinks of the one document by replacing portions of the plurality of hyperlinks of the one document that are provided by entries in the dictionary for the one document with corresponding references to the entries in the dictionary; and d) producing the transcoded document to include the dictionary and the associated references for the one document as a base hyperlink and to include the compressed hyperlinks in place of the plurality of hyperlinks of the one document.

13. The computer-implemented method of claim 12, further comprising receiving a request from the computing device for the network-accessible document before accessing the network-accessible document.

14. The computer-implemented method of claim 12, wherein the computing device is a mobile communication device.

15. The computer-implemented method of claim 14, wherein producing a transcoded document comprises modifying the network-accessible document to facilitate its effective presentation in the mobile computing and communication device.

16. The computer-implemented method of claim 12, wherein the dictionary and the references of the one document are created using a sequential compression algorithm that receives input data and sequentially generates compressed output data, wherein the compressed output data is generated based only on input data already received.

17. The computer-implemented method of claim 12, further comprising pre-pending information to the base hyperlink that specifies a server that is configured to receive and decompress a compressed hyperlink to identify a decompressed hyperlink.

18. The computer-implemented method of claim 17, further comprising accessing content provided by a source that is identified by the decompressed hyperlink.

19. A system for compressing hyperlinks in an electronic document, the system comprising:
one or more servers;
an interface to the one or more servers that is configured to access a plurality of documents that each include a plurality of hyperlinks and to provide modified documents to a computing device; and
a transcoder installed on the one or more servers that is configured to: identify, for one document of the plurality of documents, portions of the plurality of hyperlinks of the one document; add, for the one document, the identified portions of the plurality of hyperlinks as entries to a dictionary along with an associated reference for each of the added entries, wherein the dictionary and associated references for the one document are different than dictionaries and associated references for other documents of the plurality of documents; compress each of the plurality of hyperlinks of the one document by replacing portions of the plurality of hyperlinks of the one document that are provided by entries in the dictionary for the one document with corresponding references to the entries in the dictionary; and modify the one document to include the dictionary and the associated references for the one document as a base hyperlink and to replace the plurality of hyperlinks of the one document with corresponding compressed hyperlinks;
wherein each associated reference defines a shortened representation for an entry in the dictionary that corresponds to the reference.

20. A system for compressing hyperlinks in an electronic document, the system comprising:
one or more servers;
an interface to the one or more servers that is configured to access a plurality of documents that each include a plurality of hyperlinks and to provide modified documents to a computing device; and
means for modifying a document to have compressed hyperlinks, wherein the means for modifying is configured to: identify, for one document of the plurality of documents, portions of the plurality of hyperlinks of the one document; add, for the one document, the identified portions of the plurality of hyperlinks as entries to a dictionary along with an associated reference for each of the added entries, wherein the dictionary and associated references for the one document are different than dictionaries and associated references for other documents of the plurality of documents; compress each of the plurality of hyperlinks of the one document by replacing portions of the plurality of hyperlinks of the one document that are provided by entries in the dictionary for the one document with corresponding references to the entries in the dictionary; and modify the one document to include the dictionary and the associated references for the one document as a base hyperlink and to replace the plurality of hyperlinks of the one document with corresponding compressed hyperlinks;

wherein each associated reference defines a shortened representation for an entry in the dictionary that corresponds to the reference.

* * * * *